A. MALMQUIST.
MACHINE FOR SEALING CANS.
APPLICATION FILED OCT. 20, 1911.

1,039,770.

Patented Oct. 1, 1912.

WITNESSES
E. D. Nottingham
G. F. Downing.

INVENTOR
A. Malmquist
By H. A. Seymour
Attorney

UNITED STATES PATENT OFFICE.

ADOLPH MALMQUIST, OF CHICAGO, ILLINOIS, ASSIGNOR TO PERFECT VACUUM CAN CO., OF CHICAGO, ILLINOIS, A CORPORATION.

MACHINE FOR SEALING CANS.

1,039,770.  Specification of Letters Patent.  Patented Oct. 1, 1912.

Application filed October 20, 1911. Serial No. 655,800.

*To all whom it may concern:*

Be it known that I, ADOLPH MALMQUIST, a resident of Chicago, in the county of Cook and State of Illinois, have invented certain new and useful Improvements in Machines for Sealing Cans; and I do hereby declare the following to be a full, clear, and exact description of the invention, such as will enable others skilled in the art to which it appertains to make and use the same.

This invention relates to improvements in apparatus for sealing cans and more particularly to such as are adapted to effect the sealing operation in a vacuum.
One object of the invention is to provide a machine for sealing cans in vacuous chambers, which shall have a maximum capacity and yet be comparatively simple in construction.
A further object is to so construct the machine that the maintenance of a vacuum during the time the caps are being sealed to the bodies of the cans, shall be insured.

A further object is to provide means, in a machine employing a plurality of vacuous sealing chambers, to prevent air withdrawn from one sealing chamber from being discharged into another sealing chamber during the continuous operation of the machine.

A further object is to provide simple and efficient means to apply the caps to the can bodies and maintain the same in place on the can without hermetically sealing the latter until the can shall have been inclosed within the sealing chamber and subjected therein to the seaming operations.

A further object is to provide simple and efficient means for denoting the degree of perfection of the sealed cans as they leave the machine.

A further object is to so construct the apparatus that the degree of exhaustion of the several sealing chambers shall be maintained uniform under all conditions.

A further object is to construct a can sealing machine having a plurality of sealing mechanisms, that should any of said sealing mechanisms become disabled, the cans and covers will be prevented from entering such disabled mechanism.

A further object is to so construct a machine for sealing cans in vacuous chambers, as to obviate the use of stuffing boxes for the revoluble parts.

A further object is to provide simple means for controlling the connection of the exhausting means with the various vacuum sealing chambers.

A further object is to construct and arrange the seaming rolls and their operating mechanism in such manner, that the said rolls will always be so disposed when a can is to be inserted between, that they will not interfere with the ready introduction of the cans.

A further object is to provide means for insuring the ready introduction of cans into the sealing chambers, and also their discharge therefrom after the exhausting and sealing operations have been completed.

With these and other objects in view, the invention consists in certain novel features of construction and combinations of parts as hereinafter set forth and pointed out in the claims.

In the accompanying drawings: Fig. 5 is an enlarged sectional view showing the positions of the parts associated with a sealing chamber after a can has been introduced into the latter; Figs. 5$^a$ and 5$^b$ are detail views illustrating the valve in the upper end of the duct in shaft 102; Fig. 17 is a view on the line *x—x* of Fig. 1 illustrating the seaming devices.

The frame of the machine comprises a plurality of fixed uprights 1 connected at their upper ends by a spider 2 having a centrally located bearing 3 for a vertical shaft as hereinafter explained. The stationary framework also comprises in its structure, a horizontal platform 4 supported on legs 4ª and provided with bearing sleeves 5 and 7 for a main driving shaft 6. This platform is also provided with a socketed boss 8, in which the lower end of a central vertical shaft 9 has a bearing, the upper end of said shaft being mounted in the bearing 3 of spider 2.

The platform 4 of the framework sustains a fixed spider 10, having a central bearing 11 through which the lower portion of a vertical tubular shaft 12 passes, a suitable bushing 13 being disposed between said bearing and shaft. Above the spider 10, the tubular shaft 12 is made with an annular shoulder 14, and between this shoulder and the top of the bearing sleeve 13 of spider 10, anti-friction bearings 15 are located. The shaft 12 and the various devices carried thereby as hereafter explained are thus revolubly mounted upon the fixed spider 10.

The tubular shaft 12 is provided with an inverted conical hood 16 (which may be made integral therewith) and this hood is provided with a plurality of radial brackets 17 strengthened by webs 18 extending to and preferably cast integral with the tubular shaft 12. The central shaft 12, hood 16, brackets 17 and webs 18 thus constitute a revoluble frame which carries the several sealing chambers or receptacle, as will now be explained:

To each bracket 17, a hollow casting 19 is secured and forms, with a hood 20 thereon, a sealing chamber 21. The several castings are connected by a plurality of segmental table sections 22 as clearly shown in Fig. 3.

Each casting 17 is provided with a duct 23 communicating with a duct 24 in the adjacent bracket 17 for the purpose of withdrawing air from the sealing chambers in a manner hereinafter to be explained.

Figure 1:
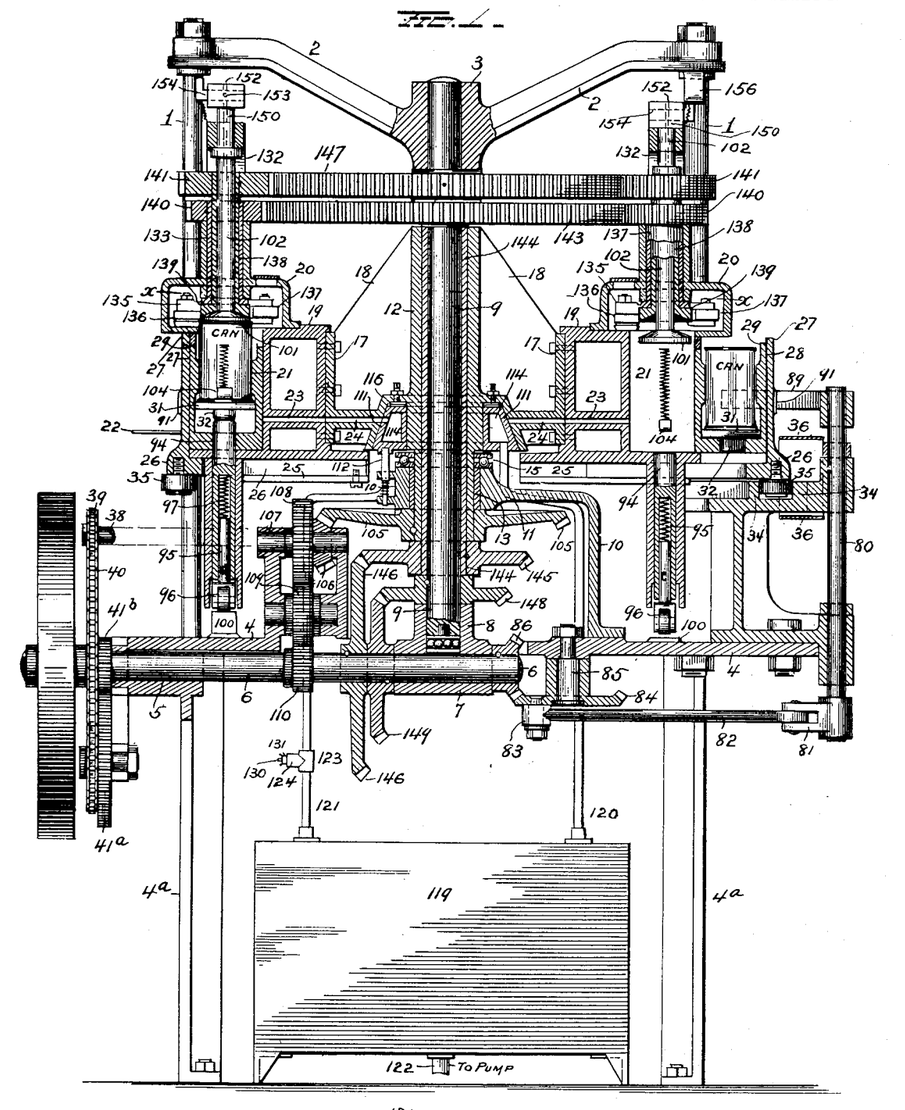
Figure 1 is a transverse vertical sectional view of the machine.

Guide-ways 25 are located under each casting 19 for the accommodation of a sliding carrier 26, the vertical wall 27 of which constitutes one wall of the vacuum sealing chamber 21 when the parts are in the positions shown at the left of Fig. 1, and the said wall 27 is provided with packing 28 so that the sealing chamber will be closed airtight. To the vertical wall of the carrier, a can receptacle 29 is secured and within the bottom of this receptacle, a block 31 is located and provided with a downward projection 32 which enters a hole 33 in the bottom of the receptacle. In a plane below one of the sealing chambers and projecting laterally beyond the same, is a V-shaped cam-way 34, into which a roller 35 depending from the carrier 26 enters, so that when the revoluble frame is turned, the carrier 26 will be caused to slide and insert a can into the sealing chamber and close the latter, or to open said receptacle and withdraw a sealed can therefrom.

While a can is within the vacuum sealing chamber, the cap or cover will be double-seamed to the can body, as will be explained, but it is desirable that the cap shall be secured to the can body without hermetically sealing it, before the can and cap are inserted into the vacuum chamber. The devices for accomplishing this result and for supplying the covered cans to the vacuum sealing chambers will now be explained.

Figures 7, 8, 9, 10:
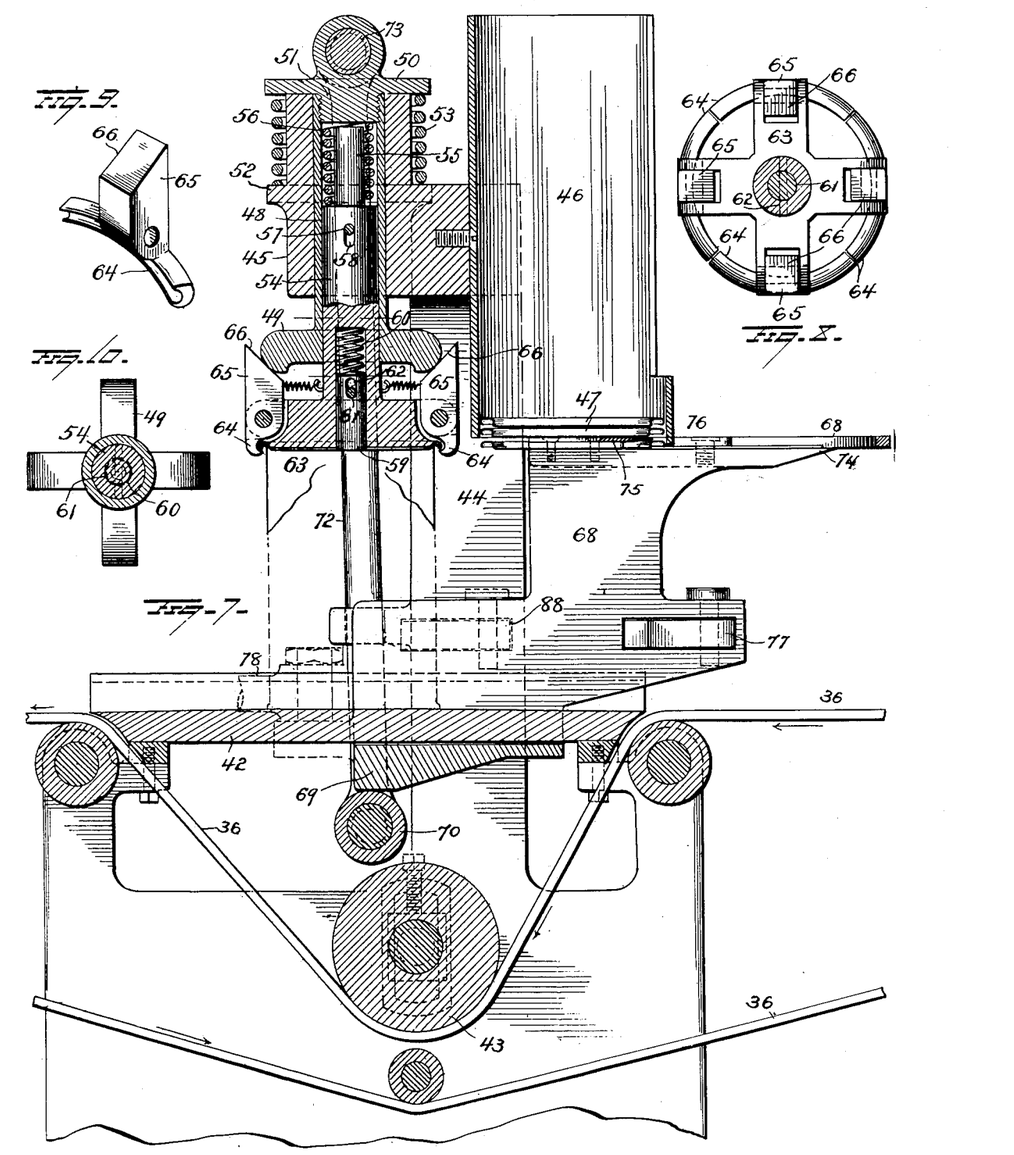
Fig. 7 is a detail sectional view showing the can capping mechanism and the means for applying the caps to the can bodies, the capping devices being shown in positions which they assume after the cap has been secured to the can body.
Figs. 8, 9, and 10 are detail views illustrating the crimping jaws and parts directly associated therewith.
Figure 7:
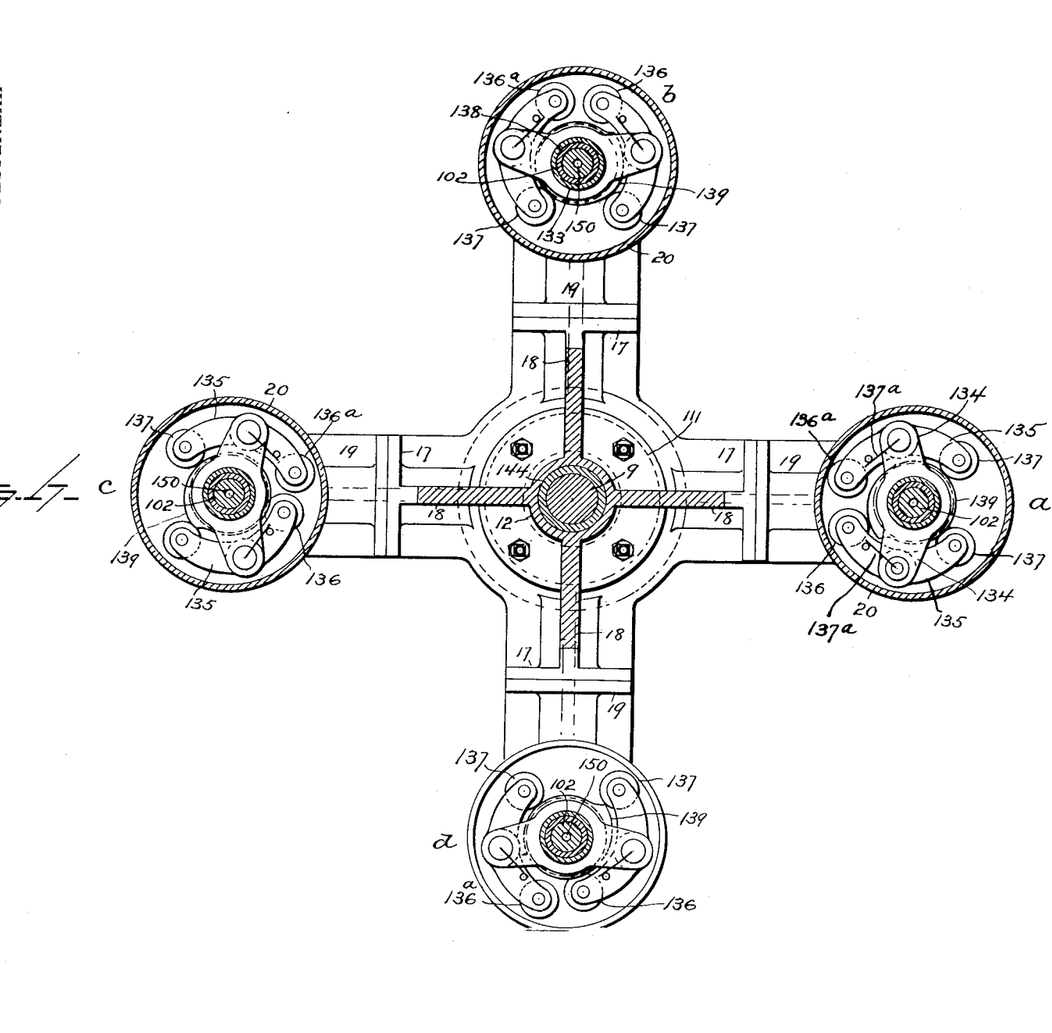
Figure 11:
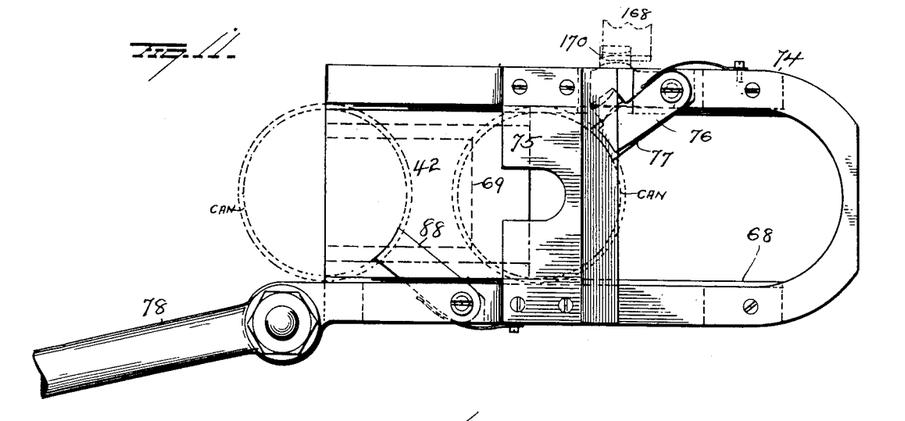
Figs. 11 to 16 are detail views of parts of the capping mechanism.
Figure 12:
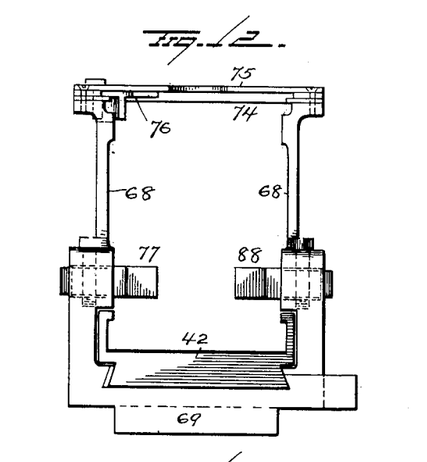
Figure 13:
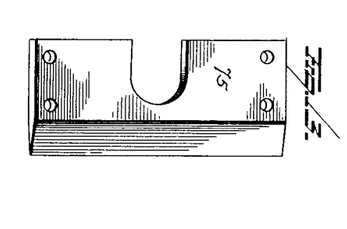
Figure 14:
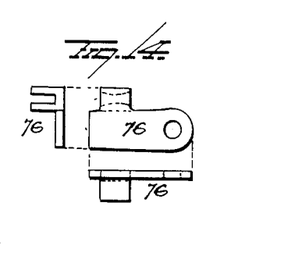
Figure 15:
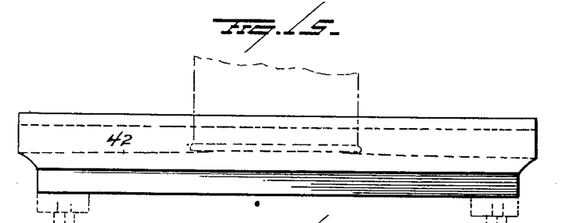
Figure 16:
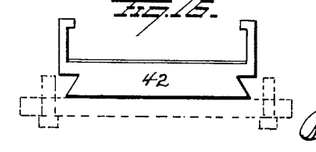

In front of the machine, a conveyer belt 36 is located and receives motion from a drum or pulley 37 on a shaft 38, the latter being provided at its other end with a sprocket wheel 39 receiving motion by means of a sprocket chain 40 from a sprocket wheel 41. Motion is imparted to the sprocket wheel 41 from the main shaft 6 by means of gears 41ª and 41ᵇ. At a point in advance of the position where the vacuum sealing chambers are opened and in advance of the cam-way 34 by means of which the sealing chambers are opened and closed, a fixed platform 42, having a convex upper face, is located in line with the conveyer belt 36, and the latter is caused to pass under this platform and under a drum or pulley 43 located below the platform, as shown in Fig. 7.

A fixed yoke 44 rises from the frame of the machine, embraces the platform 42 and extends a considerable distance above the latter. The yoke 44 is provided at its upper end with a head 45, to one side of which a magazine 46 for can caps or covers 47, is secured. The head 45 is made tubular and receives a vertically movable tube 48 provided at its lower end with a plurality of arms 49. A cap 50 is located over the head 45 and is provided with a threaded shank 51 screwed into and thus adjustably secured to the tube 48. The cap 50 overhangs the upper end of the head 45 and between this overhanging portion of the cap and an annular shoulder 52 on the head 45, a spring 53 encircling said head, is located. A shaft 54 enters the tube and is provided at its upper end with a shank 55 encircled by a spring 56 bearing at its upper end against the shank 51 of cap 50 and at its lower end against a shoulder on the shaft 54. Vertical movement of the shaft 54 is limited by a pin 57 passing through an elongated slot 58 in said shaft. The lower end of the shaft 54 is made with a socket in which a pin 59 enters. A spring 60 is located in said socket between the upper end thereof and the upper end of the pin 59, and vertical movement of said pin is limited by means of a pin 61 passing through a slot 62. The shaft 54 is provided at its lower end with a plurality of radial arms 63 corresponding in number with the arms 49. In the arms 63, crimpers 64 are pivotally supported and provided with upward extensions 65 having beveled faces 66 normally pressed against the free ends of the arms 49 by means of springs 67. It is apparent that when a can (with a cap or cover thereon) is located in the position shown in Fig. 7 and the tube 48 is depressed, the arms 49 at the lower end of said tube will operate the crimpers and cause them to crimp the flanges of the cap and can body at several points, thus firmly uniting the cap or cover to the can body without hermetically sealing the can.

Figure 6:
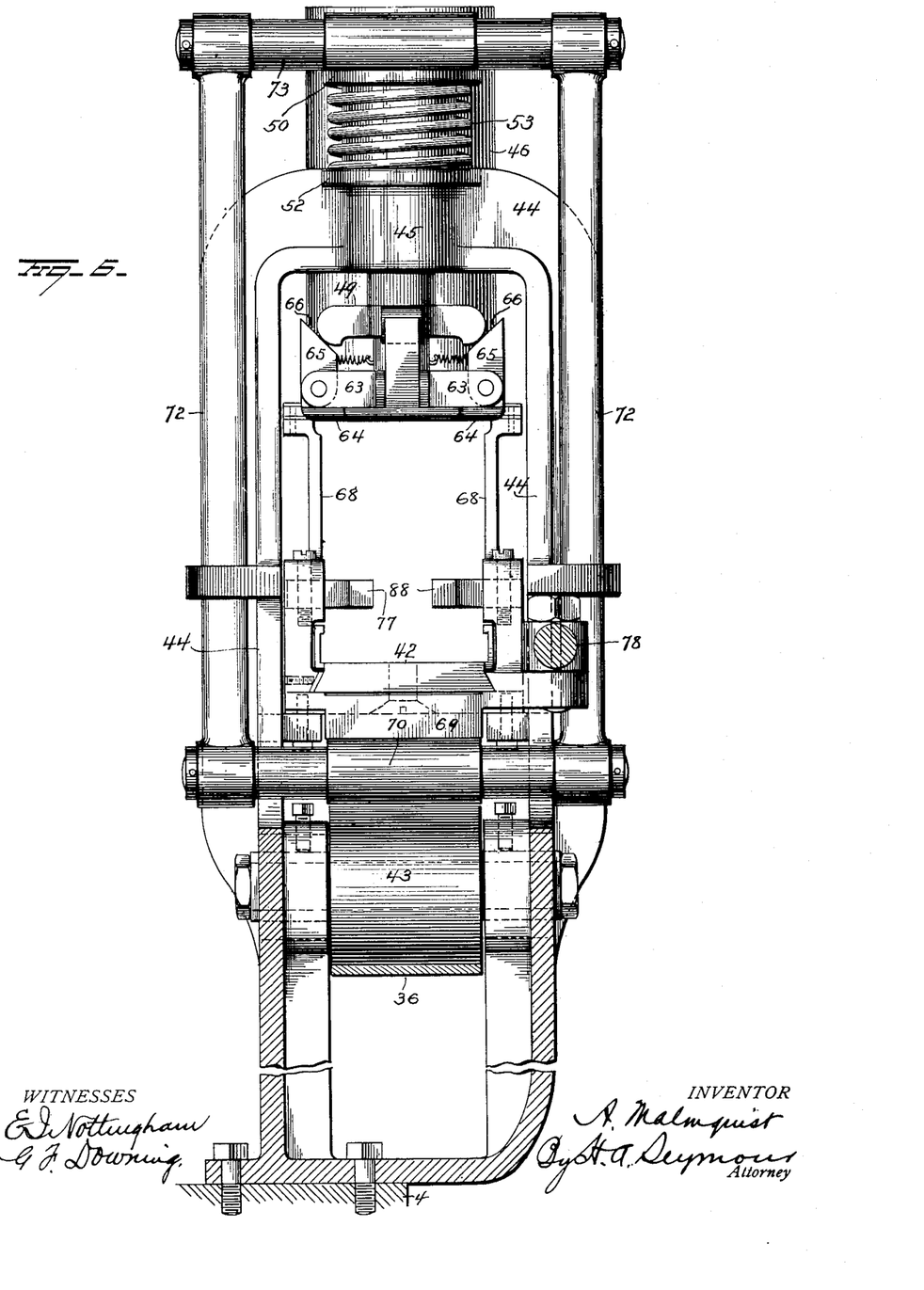
Fig. 6 is an enlarged view showing the mechanism for securing the caps or covers to the can bodies before the same are introduced into the sealing chambers.

A carriage 68 is mounted in proximity to the platform 42 and embraces the same (see Figs. 6 and 7), and below said platform, the carriage is provided with a cam 69 to engage a roller 70 on a cross bar 71. This cross-bar is connected, by means of rods or pitmen 72, with a cross-bar 73, with which the cap 50 is connected. From this construction, it will be apparent that when the carriage 68 moves in one direction, the coöperation of the cam 69 with the roller on the cross bar 71, will move the crimping devices to the positions shown in Fig. 7 and effect the crimping as above explained.

The carriage 68 is provided at its upper end with a U-shaped frame 74 which connects the upright portions of the carriage and, in effect, constitutes a portion of the latter. A blade 75 extends transversely across the top frame of the carriage 68 so that when the carriage moves in one direction, the blade will pass over the bottom cap 47 in the magazine and separate the same from the superimposed caps. The carriage 68 is also provided with spring-pressed dogs 76 and 77 disposed in position respectively to engage a can arriving on the conveyer belt and the cap at the bottom of the magazine 46.

The carriage 68 is connected, by means of a pitman 78, with a crank 79 on a vertical shaft 80 (Fig. 1) mounted in the framework. The shaft 80 is provided at its lower end with a crank arm 81 connected, by means of a pitman 82, with a crank pin 83 on a pinion 84. This pinion is mounted on a stud 85 and receives motion from a pinion 86 on the main drive shaft 6. By these means, the carriage 68 will be reciprocated.

In advance of the carriage 68, guides 87 are provided for directing the can toward the carrier 26 for the sealing chamber.

When a number of cans are being moved forwardly by the conveyer belt 36, the forward can will become disposed on the table 42 and directly under the magazine 46. At the same instant, the dogs 76—77 on the carriage 68 will engage the can and cap or cover respectively and as the carriage 68 now moves forwardly, the can and cover will be moved over the table toward the crimping mechanism. As the upper face of the table is convex, the can will be slightly elevated during its movement on the table and the cap or cover will thus be pressed up closely against the arms 63 (compressing the spring 56), and become disposed in the position shown in Fig. 7, where it will be held. When no can is under the crimping devices, the spring-pressed pin 59 will project somewhat below the plane of the under faces of the arms 63, so that when a can is moved to position under the crimping devices, the pin 59 will be moved up (compressing the spring 60) and the pin will be pressed down on the cap or cover and thus assist in holding the latter as well as the can, against displacement, when the carriage returns to the position shown in Fig. 7. The can and its cover having been placed in position under the crimping devices, the carriage 68 will be returned by means of its actuating mechanism before described, and during such return movement, the blade 75 will enter over the bottom cap or cover 47 in the hopper 46 and separate it from the superimposed caps or covers.

When the can and its cap or cover arrive under the crimping devices, the arms 49 and cap 50 will be slightly elevated by the action of the spring 53 and the crimpers will be so disposed (by the action of the springs 67) as to be out of the way of the incoming can and its cap or cover. The can and its cover having been placed in position in the crimping mechanism, the return movement of the carriage 68, will cause the cam 69 at the bottom of the carriage to coöperate with the roller on the cross bar 71 and, through the medium of the pitman 72, pull down the cross-bar 73 and depress the cap 50 against the resistance of the spring 53. This will cause the tube 48 to move downwardly and the arms 49 to coöperate with the beveled blocks 65 of the crimpers in such manner as to cause the crimpers to crimp the flanges of the can and its cap, as shown in Fig. 7, without completing a seaming operation or hermetically sealing the can. The partial crimping of the can having been thus effected, the next forward movement of the carriage 68 will cause the release of the crimping devices, by the action of the cam 69, and a spring pressed dog 88 on the carriage will engage the can and move it forwardly off of the table and onto the conveyer belt 36. The partially capped can will now be fed forward by the conveyer belt and when the guides 87 are reached, the can will be deflected laterally by said guides toward the carrier 26 of the sealing chamber. When the can has been thus deflected, it will be engaged by a finger 89, on an arm 90 and moved into the carrier 26. The arm 90 is secured to the shaft 80 and receives motion from the latter for effecting the operation of inserting a can into the carrier 26, as above described.

When the partially capped can has been placed in the carrier of the sealing chamber, the rotation of the revoluble frame carrying the sealing mechanisms and platform sections 22, will cause the coöperation of the roller 35 with the cam-way 34 to effect the insertion of the can into a sealing chamber 21 and the closing of said chamber, as hereinbefore explained. After the sealing chamber has been thus closed during the movement of the revoluble frame and before the air is exhausted from the sealing chamber, a lug or cam 91 on the vertical wall 27 of the carrier will engage a roller 92 at the end of a spring-pressed plunger 93, and thus the wall 27 of the carrier will be pressed tightly against its seat to insure the air-tight closing of the sealing chambers.

Figure 4:
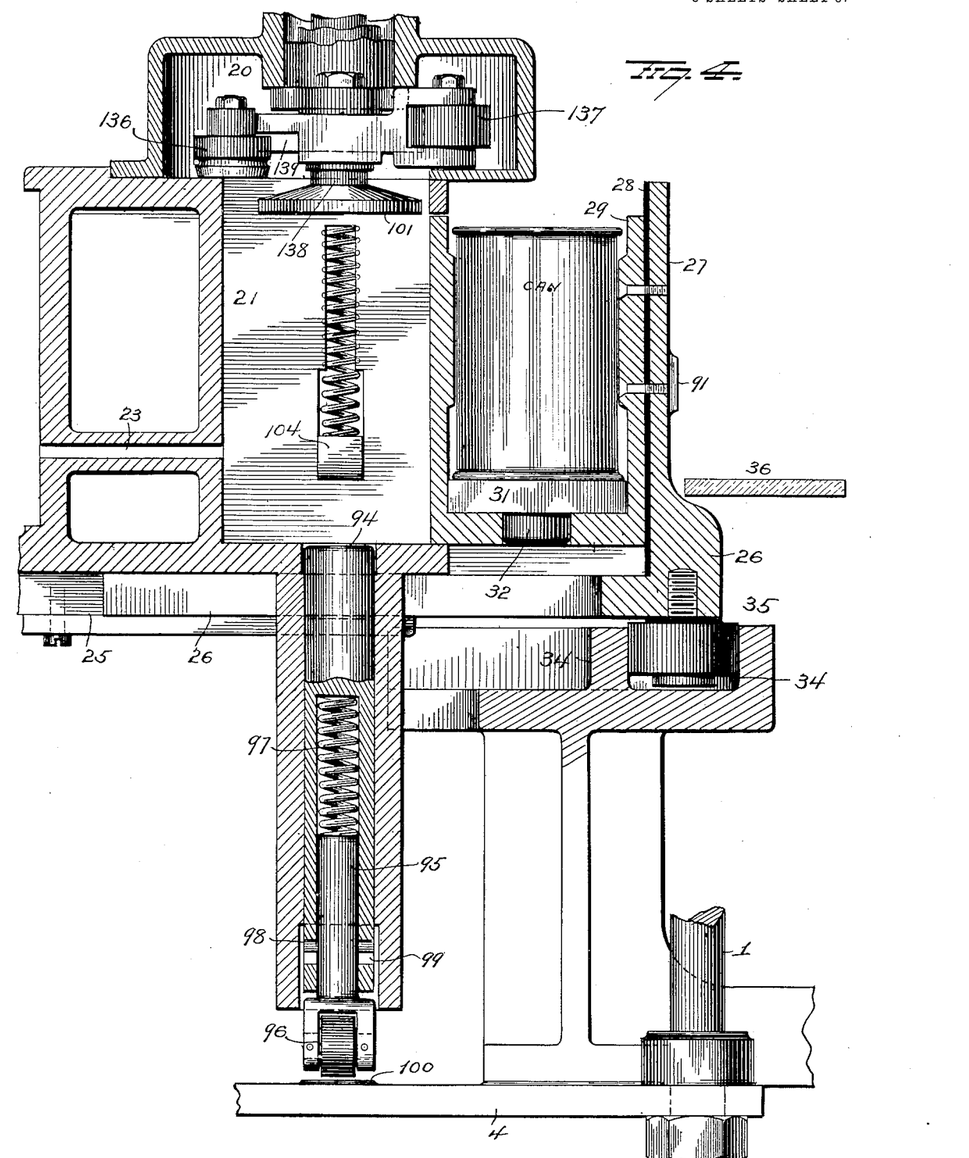
Fig. 4 is an enlarged detail view, partly in section, showing one of the seaming chambers, and operating means, the parts being shown in position ready to introduce a can and its cap or cover, into the sealing chamber.
Figures 5, 5A, 5B:
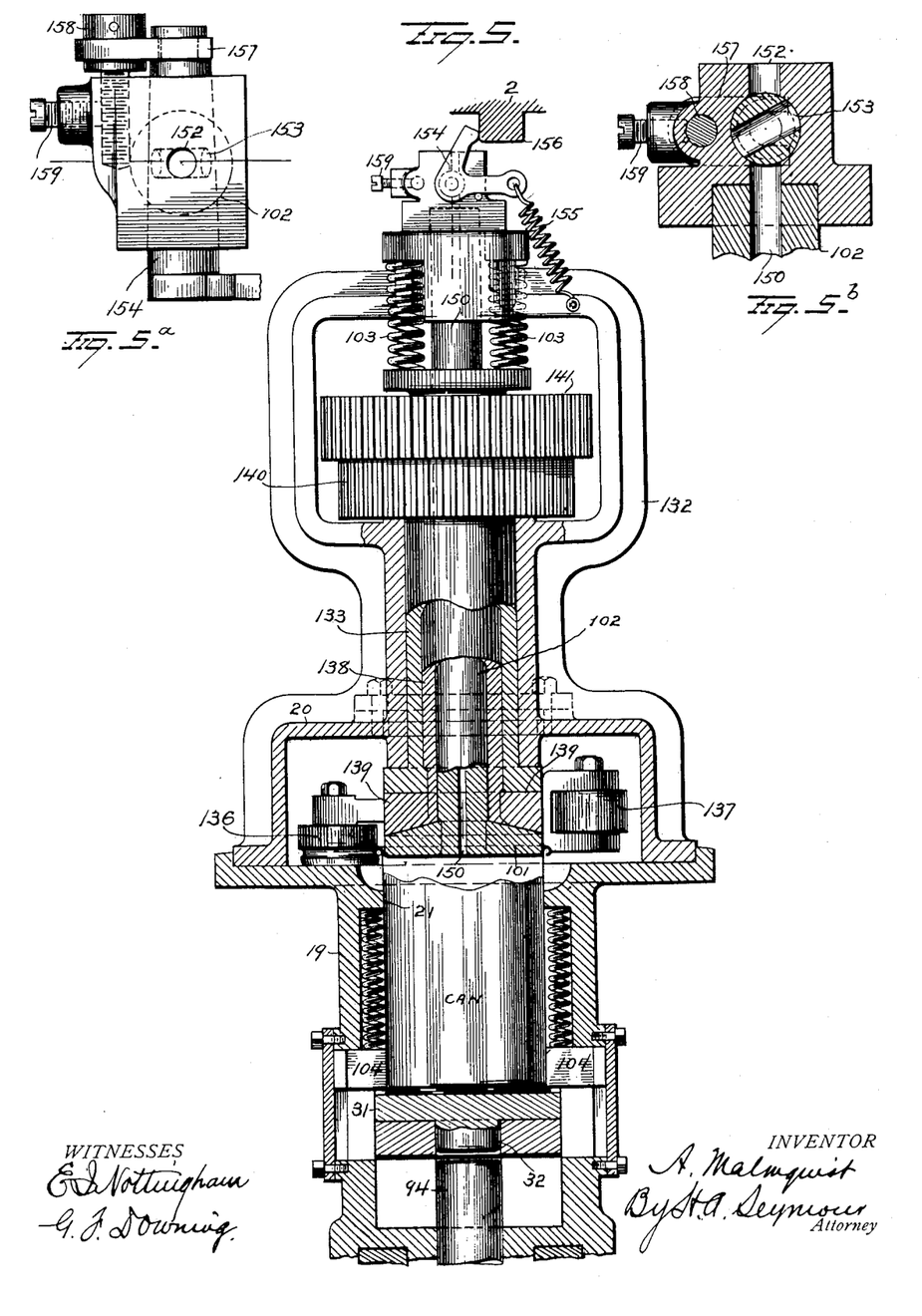

When the partially capped can has been deposited into the sealing chamber, the projection 32 depending from the block 31 on which the can rests, will become disposed over a plunger 94 movable in a tubular extension depending from and communicating with the sealing chamber. This plunger is made with a socket into which a shank 95 enters and in the lower end of this shank a roller 96 is mounted. Between the upper end of the shank 95 and the upper end of the socket in the plunger 94, a spring 97 is located. Movement of the shank 95 relatively to the plunger is limited by a pin 98 carried by the shank and movable in a slot 99 in the plunger. During the travel of the sealing chamber as the revoluble frame turns, the roller 96 will travel on a cam-way 100 on the platform 4, thus moving the plunger 94 upwardly and raising the block 31 until the cap or cover on the cam is pressed against the under surface of a head 101 on the lower end of a shaft 102, said head 101 being caused to bear against the can cover inside the flange thereof. The shaft 102 is vertically movable against the resistance of springs 103 and is maintained normally (when no can is in the sealing chamber) in the position shown in Fig. 4. When the can is raised within the sealing chamber as above explained, the head 101 and shaft 102 will be moved upwardly to the position shown in Fig. 5, so as to subject the upper end of the can and its cover to the action of seaming devices located within the head 20 of the sealing chamber.

When the can is moved upwardly in the sealing chamber, the lower flange of the can body will be engaged by vertically movable spring-pressed dogs 104 which will serve to retain the can in position and which will also act to assist in pressing the can downwardly after the sealing operations (hereinafter to be described) have been completed and the can is lowered before being discharged from the machine.

For the purpose of propelling the revoluble frame carrying the sealing appliances, a gear wheel 105 (Fig. 1) is secured to the tubular shaft 12 and receives motion from a bevel pinion 106 on a short shaft 107. This short shaft 107 carries a gear 108 receiving motion from a gear 109 and the latter is driven by a pinion 110 on the main drive shaft 6.

During the travel of the revoluble frame; after a sealing chamber has passed the spring-pressed plunger 93; the air will be exhausted from the sealing chamber and the can contained therein, so that the subsequent double-seaming operations will be fully accomplished while the can is inclosed within a vacuous chamber.

The means for exhausting the sealing chambers and maintaining vacuous conditions therein during the double seaming operations, will now be explained.

Located within the hood 16 of the revoluble frame, is a hollow conical valve casting 111 locked to the stationary spider 10 by means of a pin 112, as shown in Fig. 1. This fixed valve casting is made with two chambers 113 and 114 isolated from each other by walls 115—116, and for these chambers, elongated ports 117 and 118 respectively are provided and adapted to register with the ducts 24—23 leading to the sealing chambers. A suitable tank 119 is provided and connected with the respective valve chambers 113 and 114, by means of pipes 120 and 121, and a suitable pump is connected at 122 with the tank.

Figure 2:
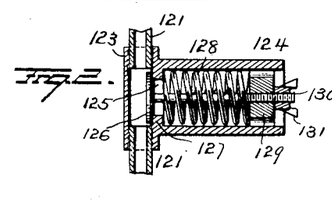
Fig. 2 is an enlarged sectional view of the valve 123 for controlling the exhausting means.

It will be observed that the machine comprises a plurality of sealing chambers in which cans are successively received and acted upon during the rotation of the revoluble frame which carries the sealing appliances. It is apparent therefore, that a plurality of sealing chambers must be maintained exhausted or vacuous at the same time. As all the sealing chambers are exhausted from a common source, viz. a single tank with which a single pump is connected, it is important that the controlling devices shall be so constructed and operated that air withdrawn from one sealing chamber will not be discharged into another sealing chamber while the double-seaming operations are in progress, and it is also important that the degree of vacuum in all the sealing chambers shall be maintained uniform. These results are accomplished by the provision of two valve chambers with which a sealing chamber is connected successively, and by the provision of a valve device 123 on the pipe 121 leading to the longer valve chamber 114. This valve device comprises a nipple 124 open at one end and communicating through a port 125 with the pipe 121. A valve 126 closes the port 125 and is normally held against its seat 127 by means of a spring 128, one end of which latter bears against the valve seat 127 and the other end of said spring bears against a perforated block 129 loosely mounted in the nipple or casing 124. The stem 130 of the valve passes freely through the block or slide 129 and is threaded for the reception of a thumb nut 131 which bears against the block or slide 129. It is apparent that by means of the thumb nut, the tension of the spring 125 can be adjusted so as to cause the valve to open when a predetermined fall of pressure occurs in the pipe 121 and in the valve chamber 114 with which said pipe communicates.

During the operation of the machine, the air will be exhausted from a sealing chamber while said chamber is in communication with the shorter valve chamber 113. The exhausting means will then be cut off momentarily when the ducts 23—24 leading to the sealing chamber pass the wall 115 which separates the valve chamber 113 from the valve chamber 114. Said ducts 23—24 will then come into communication with the elongated port of the longer valve chamber 114 and will remain in communication with the latter for maintaining the vacuum in the sealing chamber until such sealing chamber approaches the discharge point for the sealed can.

It may be assumed that two or more sealing chambers are in communication with the elongated port of the valve chamber 114 and that another sealing chamber is being exhausted through the shorter valve chamber 113 to the tank 119 and finally through the pump which exhausts the tank. Were not some means provided to prevent it, the air thus withdrawn from a sealing chamber would find its way through the tank 119 and pipe 121 to the valve chamber 114 and finally to the sealing chambers communicating with valve chamber 114, and in which sealing chambers it is desired to maintain a vacuous condition. It is desirable to cause and maintain a predetermined degree of vacuum in the several sealing chambers and to so operate the exhaust pump that a somewhat greater fall of pressure will be effected in the tank so that the passage of air from a sealing chamber while being exhausted will pass through the tank to the pump and not find its way to the sealing chambers which have been previously exhausted. In attempting to maintain such a fall of pressure in the tank, the tendency might be to maintain a too high vacuum in sealing chambers communicating with the valve chamber 114 at the expense of the exhausting of the sealing chamber being exhausted through the valve chamber 113 and pipe 120. In such case the fall of pressure in the sealing chambers will be unequal, and when the pressure in the valve chamber 114 and the sealing chambers communicating therewith, falls to an abnormal degree or to a degree for which the spring 128 of the valve device 123, is set, the fall of pressure in the pipe 121 will overcome the force of the spring 128 and said valve will open to admit atmospheric air, thus reducing the excessive fall of pressure in all the vacuous sealing chambers to be equalized.

During the time the vacuum is maintained in sealing chamber while the same is in communication with the elongated port of the longer valve chamber 114, the devices for double seaming the cap or cover to the cam body will perform their functions.

The construction and operation of the double seaming mechanism will now be explained.

From the hood 20 of each sealing chamber, a yoke or frame 132 rises and at its top, provides a bearing for the vertically movable shaft 102 which carries the head or mandrel 101, as hereinafter described.

A tubular shaft 133 is mounted in the yoke or frame 132 and depends into the hood 20 of the sealing chamber, where it is provided with horizontal arms 134. To these arms, levers 135 are pivotally connected between their ends. One arm of one lever 135 carries a seaming roller 136 and the corresponding arm of the other lever carries a finishing roll 136ª, while the other arm of each lever 135 is bifurcated and carries a plain roller 137, the latter being disposed in a horizontal plane above that of the seaming rollers. A tubular shaft 138 is mounted within the shaft 133 and surrounds the shaft 102. The tubular shaft 138 also depends into the hood portion of the sealing chamber and carries a cam-plate 139, to coöperate with the plain rollers 137 on the levers 135, and actuate said levers to cause the seaming rollers 136, 136ª to operate to seam the cap or cover to the can. The rollers 137 are pressed away from the cam plate by means of springs 137ª. The tubular shaft 133 which carries the seaming devices, is provided in the upper portion of the yoke or frame 132, with a gear 140, and the tubular shaft 138 which carries the cam 139 for controlling the operation of the seaming rollers, is provided at its upper end (within the upper portion of the yoke or frame 132) with a gear 141, which is slightly larger than the gear 140. The several smaller gears 140 receive motion from a larger gear wheel 143 carried by a tubular shaft 144 located within the shaft 12 and surrounding the shaft 9. The lower end of the shaft 144 carries a bevel gear 145 which receives motion from a larger bevel gear 146 on the main driving shaft 6. The several larger gears 141 receive motion from a large gear 147 (somewhat smaller than the large gear 143) and the said gear 147 is keyed to the central shaft 9. The shaft 9 is provided near its lower end with a bevel gear 148 (smaller than the bevel gear 145) and receives motion from a bevel gear 149 which is smaller than the gear 146.

From the construction and arrangement of gearing above described, it will be observed that the carrier arms 134 for the seaming rolls, will be rotated faster than the cam plate 139, but the same results could be attained by rotating the cam plate faster than the seaming rolls,—it being important merely, that one shall be rotated faster than the other in order that the seaming rolls shall be always so disposed when a can is inserted into a seaming device, that they will not interfere with the proper placing or discharge of the can. In practice, I prefer to rotate the seaming roll carrier and cam at a ratio of about 51 to 50 during a single revolution of a sealing chamber. While the seaming rollers 136—136$^a$ and their controlling cam 139 rotate continuously during the travel of a sealing chamber, still the seaming rolls make but a single rotation with respect to the cam 139 while the sealing chamber is revolving once around the axis of the machine.

It has been hereinbefore explained that after a can with a cover thereon has been placed in a sealing chamber and the chamber has been closed that after this chamber has passed the spring-pressed plunger 93, the air will be exhausted from the chamber, and that subsequently the vacuum will be maintained during the travel of the chamber and while the seaming operations are being performed. Now, while the sealing chamber is traveling from the point $a$ (Figs. 1, 3 and 17) toward the point $b$, and when the chamber shall have passed the spring-pressed plunger 93, the can will be elevated by coöperation of the cam 100 (Fig. 4) with the plunger 94 and the upper covered end of the can will be placed between the seaming rolls. This raising operation will be complete just before the sealing chamber reaches the point $b$ (Fig. 3) and at such time the seaming rollers will be free and so disposed as to permit the covered can to freely enter between them. The cam 139 will now operate to subject the flanged peripheries of the can and cover to the action of one of the seaming rollers (136) for the purpose of curing said flanges after the manner shown in Fig. 5. This operation will continue until the sealing chamber reaches the point $c$ (Figs. 3 and 17) when the cam 139 will (by reason of the more rapid rotation of the carriers of the seaming rollers) release the first seaming roller from the can, and submit the bead formed by said roller, to the action of the finishing seaming roller which will flatten the bead during the travel of the sealing chamber from the point $c$ (Figs. 3 and 17) to the point $d$. The double-seaming of the cover to the can will now have been completed, and during the travel of the sealing chamber to the can exit of the machine (near the starting point $a$), both seaming rollers will be free from the can and the latter will be permitted to be discharged after the sealing chamber shall have been opened.

The can cover having been doubly secured to the can body while in the exhausted or vacuous chamber, said chamber approaches the starting point $a$. During such approach, the sealing chamber will be opened by the outward movement of the can-carrier 26, such movement being effected by the movement of the roller 35 on said carrier, in the cam-way 34. Before the sealing chamber reaches the cam-way, however, the sealed can will be lowered away from the head 101, by reason of the downward movement of the plunger 95, such descent being caused by the shallow or depressed portion of the cam-way 100. When the plunger (and also the block 31 on which the can rests) descends, the spring pressed dogs 104 will tend to cause the can to follow the block. In order, however, to insure the release of the can from any connection with the seaming appliances, I have provided means whereby the top of the can will be subjected to air pressure and be thereby forced down away from the seaming appliances. For this purpose, the shaft 102 which carries the head or mandrel 101, is made with a duct 150. The shaft 150 projects above its bearing in the yoke or frame 132 and has secured to its upper end a valve block 151 communicating with the duct 150 and having a port 152. A plug valve 153 is mounted in the valve block and provided with a bell-crank-lever 154, with one arm of which, a spring 155 is connected for maintaining said valve normally closed, the other arm of said bell-crank being normally disposed in position to engage a lug 156 located on the frame-work between the point $d$ (Fig. 3) and the end of the cam-way 34. Longitudinal displacement and consequent loosening of the valve 153 may be prevented by an arm 157 carried by a screw 158 and engaging in a groove in the projecting end of the valve. The screw 158 may be held tight by means of a screw 159, and by adjusting this screw, the valve may be adjusted for wear. Now before the sealing chamber moving from the point $d$, reaches the end of the cam-way 34, the bell-crank 154 will engage the lug 156 and the valve 153 will be opened, thus opening the duct 150 and permitting an in-rush of air which will create pressure upon the top of the can and force the latter away from the head or mandrel 101 and away from the securing devices.

Figure 3:
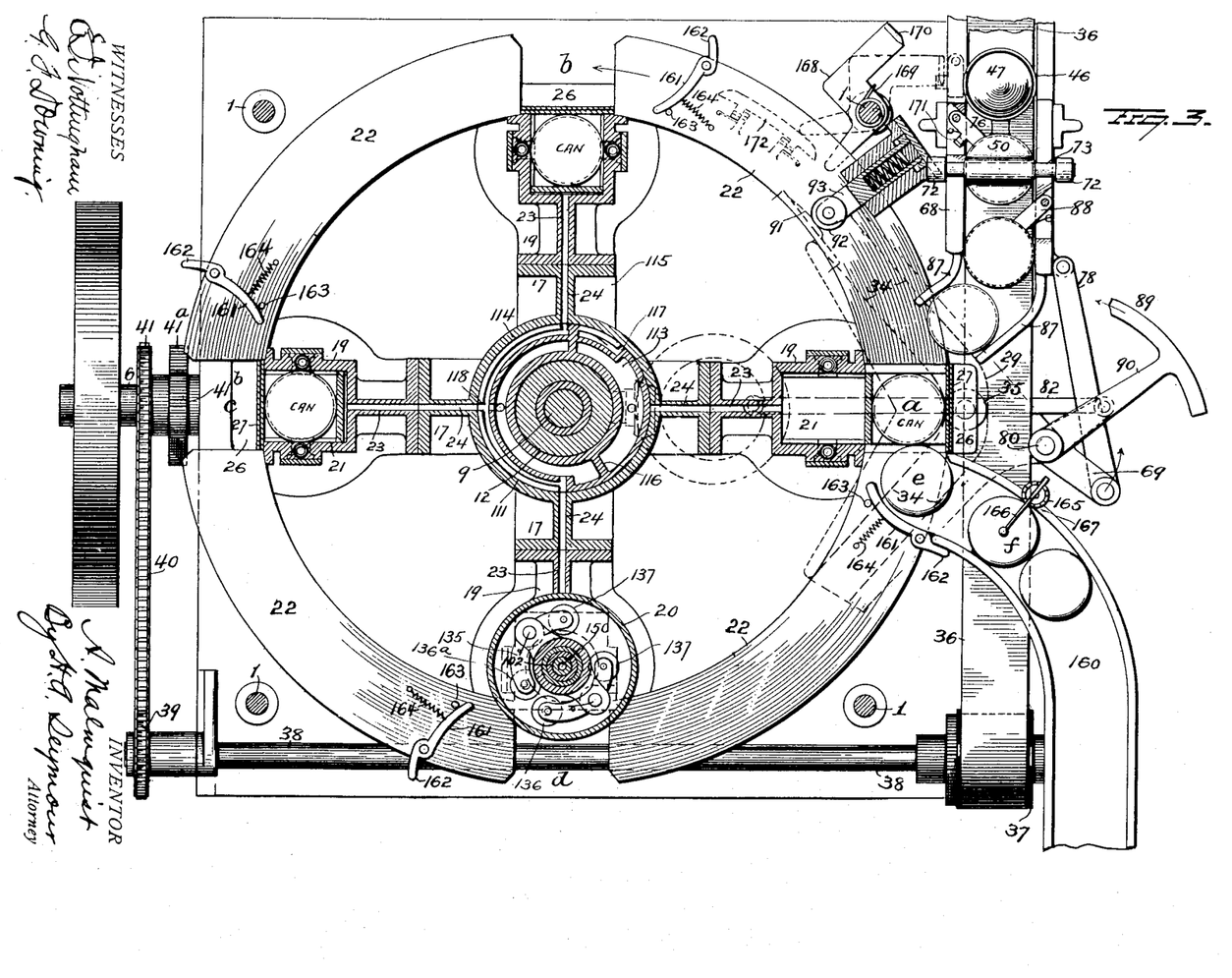
Fig. 3 is a horizontal sectional view of the machine.

When the sealed can shall have reached the position a, the pressure of an incoming can (to be sealed) will press the said sealed can out of the carrier 26, to the position shown at e, Fig. 3, at the inlet end of a discharge chute 160. Near each sealing mechanism, an arm 161 is pivotally attached to a platform member 22 and provided with a lug 162, said arm being normally pressed against a pin 163 on the platform member, by means of a spring 166. When a sealed can is discharged from a carrier 26, one of the arms 161 will form a gate and, in effect, extension of one wall of the chute 160. As the revoluble frame continues to travel, with a sealed can at e, the lug 162, engaging the wall of the discharge chute, will cause the arm or gate 161 to turn on its pivotal support and force the can e into the discharge chute to the position f in said chute, and the subsequent introduction of sealed cans into the chute will move the sealed cans forwardly to a suitable discharge point.

As the cans pass through the chute 160 they will be subjected to the action of an audible tester 165. This device comprises a hammer 166 operated by a ratchet drum 167, which latter is rotated by the movement of the can through the chute. The skilled attendant knows by the sound produced by tapping on the can top, whether the can is perfect or has a hole in some part of it and the purpose of the hammer tester is to give this information.

Should it happen that any of the sealing mechanisms fails to properly operate, it will be desirable to prevent the introduction of cans into such sealing mechanism. For this purpose, I provide a retractor 168, held normally inoperative by means of a spring 169. One arm of the retractor is made with a member 170 to engage loops 171 on the dogs 76—77 on the carriage 68. The table members 22 have mounted thereon, normally adjustable cams 172, one of which is shown in dotted lines in Fig. 3. When one of these cams 172 is thrown to the position shown in Fig. 3, it will engage an arm of the retractor 168 and cause the member 170 of the retractor to engage the loops 171 of dogs 76 and 77 and withdraw said dogs so that they cannot engage a can and cover when the carriage 68 moves forwardly, and hence, under such conditions, a can will not be inserted into the disabled sealing mechanism. As soon as the cam 172 has passed the retractor, the latter will be moved to its normal position and out of engagement with the dogs 76—77 so that the latter can operate to move a can and cover forward to be inserted into the next sealing mechanism.

Having fully described my invention what I claim as new and desire to secure by Letters-Patent, is:—

1. In a machine for seaming cans in vacuum, the combination with a revoluble frame and a plurality of sealing chambers carried thereby, of a valve having two chambers, a single exhausting means communicating with both of said chambers, and means for connecting said valve chambers successively with each of said sealing chambers.

2. In a machine for sealing cans in vacuum, the combination with a revoluble frame and a plurality of sealing chambers carried thereby, of a valve having a short and a long chamber, a single exhausting means communicating with both of said chambers, means for connecting the short valve chamber with a sealing chamber to exhaust the latter, and means for subsequently connecting the long valve chamber with said sealing chamber to maintain the latter vacuous.

3. In a machine for sealing cans, in vacuum, the combination with a revoluble frame, and a plurality of sealing chambers carried thereby, of a valve having separated chambers, means for connecting said chambers successively with each sealing chamber, exhausting means, pipes connecting said exhausting means with the respective valve chambers, and a normally closed relief valve connected with one of said pipes.

4. In a machine for sealing cans, the combination with a revoluble frame, and a plurality of sealing chambers carried thereby, of a valve having a short and a long chamber, means for connecting each sealing chamber first with the short valve chamber and then with the long valve chamber, exhausting means, pipes connecting the exhausting means with both valve chambers and means for automatically compensating for an excessive fall of pressure in the long valve chamber and the sealing chambers communicating therewith.

5. In a machine for sealing cans, the combination with a revoluble frame, and a plurality of sealing chambers connected therewith, of a valve having two chambers, means for connecting said chambers successively with the sealing chambers, a single exhausting means, pipes connecting said exhausting means with both valve chambers, one of said pipes having an opening between its ends, and an adjustable spring-actuated valve normally closing said opening for automatically compensating for an excessive fall of pressure in one of said valve chambers and the sealing chambers communicating therewith.

6. In a machine for sealing cans, the combination with a revoluble frame, and a plurality of sealing chambers carried thereby, of an inverted hood located centrally in said frame and carried thereby, said frame having radial ducts connecting said hood with the several sealing chambers, a fixed valve casting located within said hood and provided with two chambers having elongated ports to communicate successively with the ducts leading to the respective sealing chambers, and exhausting means connected with both of said valve chambers.

7. In a machine for sealing cans, the combination with a traveling frame and a sealing chamber carried thereby having a lateral opening, of a can carrier, means for discharging a can into said carrier, a fixed cam-way, a projection on the carrier to move in said cam-way to move the carrier laterally into and out of the sealing chamber through the lateral opening of the latter, means for exhausting the sealing chamber, and seaming means in the sealing chamber.

8. In a machine for sealing cans, the combination with a revoluble frame and a plurality of sealing chambers carried thereby, of a set of seaming devices in each sealing chamber, each set of seaming devices comprising seaming rolls, a carrier therefor, a cam for moving the seaming rolls toward the can, springs for moving said rolls away from the can, and means for rotating the seaming roll carrier and the cam, one faster than the other.

9. In a machine for sealing cans, the combination with a revoluble frame, a plurality of sealing chambers carried thereby, and means for holding a can stationary in each sealing chamber, of a set of seaming devices in each sealing chamber, each set of seaming devices comprising a revoluble carrier, seaming rolls carried thereby, means for moving the seaming rolls away from the can, a revoluble cam for moving the seaming rolls toward the can, means for revolving the revoluble frame, and means for rotating each seaming roll carrier and cam, one faster than the other.

10. In a machine for seaming cans, the combination with a revoluble frame, a plurality of sealing chambers carried thereby, and means for holding cans stationary in the sealing chambers, of a set of seaming devices in each sealing chamber, each set of seaming devices comprising a revoluble carrier, levers mounted on said carrier, a seaming roll and a plain roll mounted at respective ends of each lever, springs connected with the levers for moving the seaming rolls away from the can, a revoluble cam coöperating with the plain rolls, means for revolving the revoluble frame, and means for rotating the seaming roll carrier and the cam, one faster than the other.

11. In a machine for sealing cans, the combination with a traveling sealing chamber, and means for inserting a can thereinto, of seaming devices in the upper portion of said sealing chamber, a yielding head below said seaming devices, a vertically movable plunger, means for raising said plunger to press the can top against the yielding head and raise the can to the seaming devices, and spring-pressed dogs in the walls of the sealing chamber to press on the bottom flange of the can and hold the latter to its seat in the sealing chamber.

12. In a machine for sealing cans, the combination of a traveling sealing chamber, exhausting means therefor, seaming devices operable in the sealing chamber, means for inserting a covered can into the sealing chamber, and means for partially capping the can without hermetically sealing it before it is inserted into the sealing chamber.

13. In a machine for sealing cans, the combination with a traveling sealing chamber, seaming devices operable therein, means for exhausting the sealing chamber, means for securing a cap to a can without hermetically sealing the same, and means for inserting the partially capped can into the sealing chamber.

14. In a machine for sealing cans, the combination with a sealing chamber, means for exhausting the same and seaming means operable in the sealing chamber, of a cap applying means comprising crimpers for securing a cap to a can, means for operating the crimpers, and means for moving the partially capped can to the sealing chamber.

15. In a machine for sealing cans, the combination with a sealing chamber, means for exhausting the same, and seaming devices operable in the sealing chamber, of cap-applying means, comprising a table, a cap magazine, a carriage for moving a can and a cap upon said table, crimping means above the table, means for operating the crimping means to crimp the cap to the can, and means for moving the partially capped can from said table to the sealing chamber.

16. In a machine for sealing cans, the combination with a sealing chamber, seaming devices operable therein, and means for exhausting the sealing chamber, of capping mechanism comprising a table having a convex upper face, a yielding member above said table, means for moving a can and its cover over said table and under said yielding member, crimpers carried by said yielding member, means for operating said crimpers to attach the cover to the can, and means for inserting the partially capped can into the sealing chamber.

17. In a machine for sealing cans, the combination with a sealing chamber, seaming means operable therein, and means for exhausting said chambers, of capping mechanism, comprising crimping devices, a cap magazine, a carriage, dogs mounted on the carriage for moving a can and cap to position under the crimping devices when the carriage moves forwardly, means operable by the carriage for operating the crimping devices, and means for inserting the partially capped can into the sealing chamber.

18. In a machine for sealing cans, the combination with a sealing chamber, seaming devices operable therein, and means for exhausting said chamber, of capping mechanism comprising a table, crimpers above the table, arms for operating the crimpers, a carriage for moving a can and cap onto the table and subjecting the same to the crimpers, a cam carried by said carriage, means operable by said cam to operate the crimper-operating arms and means for inserting the partially capped can into the sealing chamber.

19. In a machine for sealing cans, the combination with a sealing chamber, seaming means operable in the sealing chamber, and means for exhausting the sealing chamber, of capping mechanism, comprising a table, crimping devices above the table, a cap magazine, a carriage, means for reciprocating the carriage over the table, dogs on said carriage to engage a can and cap and move the same onto the table under the crimping devices, a cam on the carriage, devices coöperating with said cam to operate the crimping devices, a blade on said carriage to separate the bottom cap from the superimposed caps in the magazine when the carriage makes its return movement, and means for inserting the partially capped can into the sealing chamber.

20. In a machine for sealing cans, the combination with a revoluble frame, a plurality of vacuous sealing mechanisms carried thereby, and means for revolving said frame, of capping mechanism, means for moving cans from the capping mechanism to the sealing mechanisms, and means for preventing the operation of the capping mechanism should any of the sealing mechanisms become disabled.

21. In a machine for sealing cans, the combination with a revoluble frame and a plurality of vacuous sealing mechanisms, of capping mechanism, a reciprocating carriage constituting a part of said capping mechanism, dogs on said carriage for moving a can and cap forwardly in the capping mechanism, means for moving a partially capped can from the capping mechanism and inserting it into a sealing mechanism, a retractor to coöperate with the dogs on said carriage, and manually operable cams on the revoluble frame for operating said retractor to withdraw the dogs on the carriage to prevent the forward movement of a can and cap if any of the sealing mechanisms should become disabled.

22. In a machine for sealing cans, the combination with a revoluble frame, and sealing chambers carried thereby, a can carrier for each sealing chamber, means for moving a can carrier into a sealing chamber and simultaneously closing the latter, a spring-pressed plunger in position to be engaged by a closed carrier to press the same tightly to its seat, means for exhausting the closed sealing chamber, and seaming means in each sealing chamber.

23. In a machine for sealing cans, the combination with a traveling sealing chamber, a sliding can carrier movable therewith, a carriage, and a guideway to receive cans from the carriage, of a shaft, means for oscillating said shaft, a crank arm on said shaft, a pitman connecting said crank arm with the carriage, an arm secured to said shaft to engage a can and force it into a carrier, and means for moving the carrier into the sealing chamber and closing the latter.

24. In a machine for sealing cans, the combination with a revoluble frame, a plurality of sealing mechanisms carried by said frame, and a chute terminating adjacent to said frame, of a pivoted arm or gate located on the revoluble frame near each sealing mechanism and having a lug or extension to engage one wall of said chute, a stop near each pivoted arm or gate and a spring for normally pressing each arm or gate against its stop.

25. In a machine for sealing cans, the combination with a sealing chamber, means for exhausting the same and seaming devices operable within said chamber, of a member having a duct communicating with the vacuum sealing chamber, a normally closed valve in said duct, and means for opening said valve after a can has been sealed, whereby air pressure will be applied to the sealed can to force it away from the seaming devices within the sealing chamber.

26. In a machine for sealing cans, the combination of a sealing chamber, means for exhausting the same, seaming means in the vacuous chamber, a discharge chute to receive sealed cans, and an audible tester adjacent to said discharge chute.

In testimony whereof, I have signed this specification in the presence of two subscribing witnesses.

ADOLPH MALMQUIST.

Witnesses:
A. N. MITCHELL,
R. S. FERGUSON.